Figure 1:
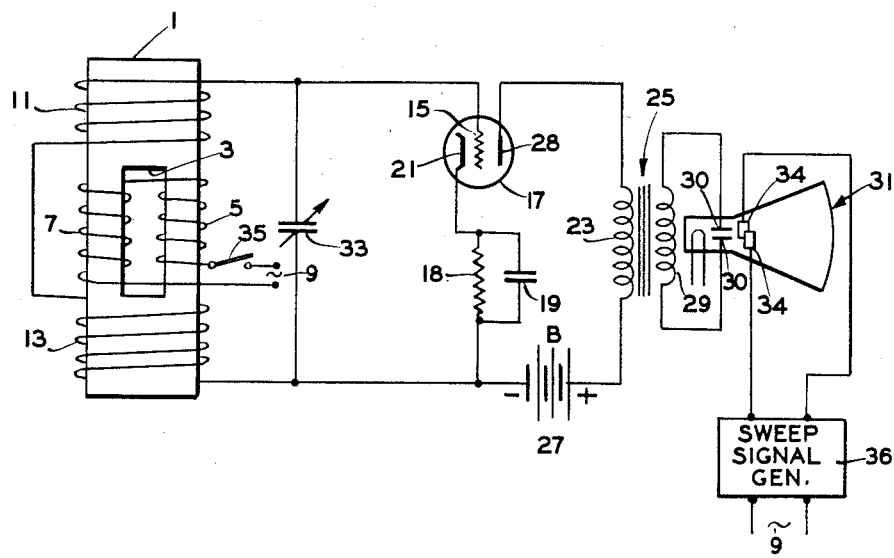

INVENTOR.
ALFRED A. STUART JR.
BY
*ATTORNEY*

United States Patent Office 2,695,384
Patented Nov. 23, 1954

2,695,384

INDUCTIVE DEVICE OF THE SATURABLE CORE TYPE HAVING FLUX REGENERATION CHARACTERISTICS

Alfred A. Stuart, Jr., Hasbrouck Heights, N. J., assignor to Bendix Aviation Corporation, Teterboro, N. J., a corporation of Delaware Application November 1, 1949, Serial No. 124,918

7 Claims. (Cl. 324—43)

The invention relates to inductive devices and to a method of operating such devices.

Inductive devices of the kind used heretofore, having an exciting winding and an output winding, produce relatively low signal voltages in the presence of weak magnetic fields, and the signals often are of such low magnitude that they cannot be used effectively.

The main object of the present invention is to produce, in a novel manner, flux regeneration in an inductive device of the kind described so that relatively large signal voltages are induced in the output winding even in the presence of relatively weak magnetic fields.

Another object is to provide novel apparatus for detecting a weak magnetic field and determining the direction and polarity of the field.

The invention contemplates producing flux regeneration, in the presence of a magnetic field, in an inductive device having a saturable core of permeable material provided with exciting and output windings. The exciting winding is energized by an alternating current having an amplitude substantially greater than that required to saturate the core and suitable for proper phase relation between the exciting and output currents. The frequency of the exciting current preferably is between 600 and 1600 cycles per second as determined by the characteristics of the inductive device. The load circuit, connected to the secondary winding, is tuned to resonance at a frequency twice that of the energizing current.

The foregoing and other objects and advantages of the invention will appear more full hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

In the drawing, Figure 1 is a schematic wiring diagram showing an electric circuit for regenerating flux in an inductive device in a novel manner and for measuring the output of the inductive device.

Figure 2:
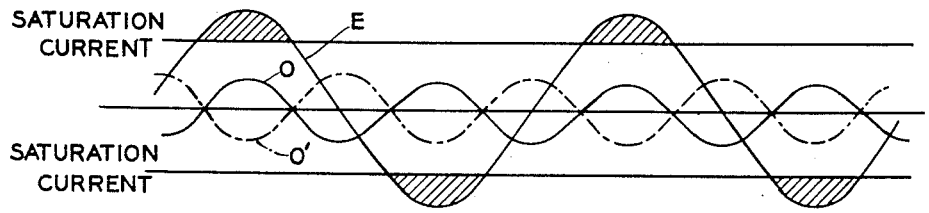

Figure 2 shows the relationship between the exciting current and the induced output current for maximum flux regeneration.

Referring now to the drawing for a more detailed description of the novel inductive device of the present invention, the latter is shown as comprising a saturable core 1 of magnetically permeable material, such as "Permalloy" or "Mumetal," having an aperture 3 extending centrally therethrough. A pair of exciting coils 5, 7 are wrapped in opposite directions about the central portion of the core adjacent the aperture, and the coils are connected in series to an alternating current source 9, preferably of approximately 1000 cycles per second, although other frequencies may be used. This produces magnetic flux in the core and the flux at any instant through the portions of the core within windings 5, 7 is in opposite directions.

A pair of series connected secondary coils 11, 13 are wound at the ends of the core and adjacent exciting coils 5, 7. One end of secondary coil 11 is connected to the control grid 15 of an amplifier tube 17, and one end of secondary coil 13 is connected through a resistance 18 and condenser 19 in parallel to the cathode 21 of the tube. The positive terminal of a B power supply 27 is connected through the primary 23 of a transformer 25 to the plate 28 of tube 17, and the negative terminal of B power supply 27 is connected to cathode 21 through parallel resistor 18 and condenser 19. A variable condenser 33 is connected in parallel with secondary coils 11, 13 and is adjusted so that the load circuit is tuned to resonance at a frequency twice that of the exciting frequency. The transformer secondary 29 is connected to the plates 30 of a cathode ray tube 31 or to any other suitable phase indicator. The amplifier and transformer are not essential and plates 30 of cathode ray tube 31 may be connected directly to the terminals of exciting coils 11, 13 and in parallel with condenser 33.

Plates 34 of cathode ray tube 31 are connected in the usual manner to a sweep signal generator 36 energized by alternating current source 9.

The magnitude of the exciting current E (Figure 2) is adjusted so that the core is saturated (indicated by the shaded area) at an appropriate time each cycle to obtain the proper phase relation between the exciting voltage and the induced voltage and so that the output current regenerates magnetic flux and creates a magnetic field in the ends of the core. This condition is attained when either the positive or negative half cycles of output current occur during saturation of the core.

As shown in solid lines in Figure 2, the positive half cycles of output current O occur during saturation of the core and are less effective in producing flux in the core than the negative half cycles of output current O because the reluctance of the core periodically increases during saturation and decreases when the core is unsaturated. By reversing the magnetic field, the negative half cycles of output current O' may occur during saturation of the core, as shown in dot-dash lines in Figure 2, and are less effective in producing flux than the positive half cycles of output current. As a result of the effective blanking out of the positive or negative half cycles, a unidirectional pulsating magnetic field is set up in the core in the same direction as the original field and adds to the original field. The material of the core, while of virtually zero magnetic retentivity for normal uses, nevertheless has sufficient short time retentivity so that the reenforcing of the original field causes the ouput during the second cycle of operation to be greater than the first cycle, and the output of each succeeding cycle exceeds the preceding cycle until the entire core is saturated and a relatively large output voltage results. The original field then may be removed, or even reversed, with little change in output. The action taking place may be considered as flux rectification, although no current rectification occurs.

The device is especially useful in detecting a weak magnetic field and determining its direction and polarity. To this end, the excitation current is interrupted periodically by a switch 35 or other suitable current interrupting means which may be operated by a vibrator (not shown) or other suitable device. Core 1 is rotated in the magnetic field and when the core passes perpendicular to the field, the phase of the output voltage indicated by the cathode ray tube reverses and the direction and polarity of the field may be readily determined.

High excitation currents are preferred to obtain proper phase relation between the exciting and output currents and proper dwell of saturation value of current. The excitation frequency must be of a suitable value, and it has been found that the effect can be satisfactorily obtained with excitation frequencies between 600 and 1600 cycles per second for the particular core used, although this may vary considerably with various materials and core dimensions. Also, the output circuit must be tuned to almost exact resonance at a frequency twice that of the exciting frequency. The output circuit must be without substantial load, as shown, so that the output voltage is relatively high. It has been found with only a tuning condenser in the output circuit, the output voltage, when regeneration occurred in the earth's magnetic field, was approximately 150 volts, whereas the same device operated non-regeneratively in the earth's field, produced a maximum of only 2 volts.

Although but one embodiment of the invention has been illustrated and described in detail, it is to be expressly understood that the invention is not limited thereto. Various changes may be made in the design and

What is claimed is:

1. An inductive device having an exciting winding and an output winding on a magnetically permeable core, a source of current for energizing said exciting winding and having an amplitude substantially greater than is required to saturate the core and frequency to provide the proper phase relation between the exciting and output currents so that substantially peak output current occurs during saturation of the core, said output winding having induced therein a voltage twice the frequency of the energizing current, and a circuit including said output winding and tuned substantially to resonance at the frequency of the output voltage.

2. An inductive device having a magnetically permeable core with an exciting winding and an output winding, a substantially resonant circuit including said output winding, and a current source for energizing said exciting winding and having a value substantially greater than is required to saturate the core and a frequency to provide the proper phase relation between the exciting and output currents so that substantially peak output current occurs during maximum saturation of the core.

3. In apparatus for detecting magnetic fields, an inductive device having a magnetically permeable core with an output winding and with an exciting winding, an alternating current source for energizing said exciting winding and having an amplitude substantially greater than is required to saturate the core and frequency to provide the proper phase relation between the exciting and output currents so that substantially peak output current occurs during saturation of the core, a variable condenser connected to the output winding and tuned substantially to resonance at the output frequency, and an indicator in circuit with said output winding and condenser to indicate the polarity and direction of the magnetic field.

4. In apparatus for detecting magnetic fields, an inductive device having an exciting winding and an output winding on a magnetically permeable core, a source of current for energizing said exciting winding and having an amplitude substantially greater than is required to saturate the core and frequency to provide phase relation between the exciting and output currents so that substantially peak output current occurs during saturation of the core, means for periodically interrupting the energizing current, said output winding having induced therein a voltage twice the frequency of the energizing current, and means connected to said output windings for indicating the phase of the induced voltage.

5. In apparatus of the kind described, an inductive device having a magnetically permeable core with an exciting winding and an output winding, a circuit including a capacitor and said output winding, and a current source for energizing said exciting winding and having a value substantially greater than is required to saturate the core and having a frequency to provide the proper phase relation between the exciting and output currents so that substantially peak output current occurs during saturation of the core.

6. In apparatus for detecting magnetic fields, an inductive device having a magnetically permeable core with a substantially central aperture, a pair of exciting windings wrapped about the central portion of the core adjacent the aperture, a pair of output windings wound about the ends of the core and connected in series with one another, a condenser connected across the output windings, an alternating current source for energizing said exciting winding and having an amplitude substantially greater than is required to saturate the core and having a frequency to provide the proper phase relation between the exciting and output currents so that substantially peak output current occurs during saturation of the core and means to detect current flow in said output windings.

7. In apparatus for detecting magnetic fields, an inductive device having a magnetically permeable core with a substantially central aperture, a pair of exciting windings wrapped about the central portion of the core adjacent the aperture, a pair of output windings wound about the ends of the core and connected in series with one another, an alternating current source for energizing said exciting winding and having an amplitude substantially greater than is required to saturate the core and having a frequency to provide the proper phase relation between the exciting and output currents so that substantially peak output current occurs during saturation of the core, a condenser connected across the output windings and tuned substantially to resonance at the output frequency, an amplifier connected to said output windings, and a cathode ray tube connected to the output of said amplifier to indicate the presence of a magnetic field.

References Cited in the file of this patent

UNITED STATES PATENTS

| Number | Name | Date |
| --- | --- | --- |
| 2,261,309 | Stuart | Nov. 4, 1941 |
| 2,406,870 | Vacquier | Sept. 3, 1946 |
| 2,410,039 | Beach | Oct. 29, 1946 |
| 2,418,553 | Irwin | Apr. 8, 1947 |

FOREIGN PATENTS

| Number | Country | Date |
| --- | --- | --- |
| 619,525 | Great Britain | Mar. 10, 1949 |